United States Patent Office 3,329,654
Patented July 4, 1967

3,329,654
PRODUCTION OF SYNTHETIC FORMALDEHYDE-KETONE RESINS
Helmut Schwarzhans, Moers, Germany, assignor to Rheinpreussen Aktiengesellschaft für Bergbau und Chemie, Homberg (Lower Rhine), Germany, a corporation of Germany
No Drawing. Filed Nov. 21, 1962, Ser. No. 239,313
Claims priority, application Germany, Dec. 12, 1957, R 22,335
4 Claims. (Cl. 260—64)

This application is a continuation-in-part of application Ser. No. 779,355, filed Dec. 10, 1958, now abandoned.

The present invention relates to the production of synthetic resins. More particularly, the invention relates to the production of synthetic resins by condensation reactions involving ketones and aldehydes which are carried out in the presence of a condensing agent.

Synthetic resins derived by condensation of ketones and aldehydes are useful as components of varnish compositions. Heretofore, production of these synthetic resins has been inconvenient as, by the production methods heretofore known, reaction times are excessive and, in general, the reactions are carried out batch-wise, a plurality of steps each having different conditions being employed. There is known, a continuous process for the production of resins by condensation reactions, involving cyclohexanone and its homologs with aldehydes. This known continuous method, however, has the disadvantage that relatively long reaction times are required and that at least two reaction vessels are employed.

A primary object of the present invention is the provision of a method for the production of the synthetic resins which is adapted to be carried out in a continuous manner and which involves relatively short reaction times and yields a product of improved color and more uniformity in properties. A further object is to provide a method which can be conveniently carried out and controlled.

According to the invention, these objects are attained by condensation reactions wherein a ketone or ketones and an aldehyde or aldehydes are condensed in the presence of an alkaline material as a condensing agent. The method involves introducing the reactants and condensing agent into a mixing zone and therein rapidly mixing the reactants and condensing agent to form an admixture in which the reactants and condensing agent are substantially uniformly dispersed. Further, the mixing is carried out so that the admixture is at substantially reaction temperature at the conclusion of the mixing. Desirably, at the time of introduction of the reactants into the mixing zone, they are at temperatures such that reaction temperature or substantially reaction temperature forms in situ. Following mixing, the admixture is introduced into a reaction zone, and is maintained present in the reaction zone for a time sufficient for the condensation reaction to occur.

In a preferred embodiment of the invention, one of the reactants at the time of its introduction into the mixing zone is at a temperature above the condensation temperature and the other reactant at the time of its introduction into the mixing zone is at a temperature below the temperature at which the condensation reaction is carried out, and the temperatures are such that upon mixing, substantially the reaction temperature forms in situ, i.e., by heat transfer between the reactants substantially reaction temperature is attained. Desirably, the condensing agent is added to the reactant which is introduced into the mixing zone at a temperature below the condensation temperature. Thus, for example, the ketones can be introduced into the mixing zone at a temperature in excess of the temperature maintained in the reaction zone, the aldehyde can be introduced into the mixing zone at a temperature below the condensation temperature, and the condensing agent can be added to the aldehyde before introduction thereof into the mixing zone. alternatively, the aldehyde can be heated when cold (i.e. room temperature) ketone is used and in this case the condensing agent can be added to the ketone. If desired both aldehyde and ketone can be heated and in this case the condensing agent can be added as such to the mixing device, i.e. without first being combined with the aldehyde or ketone. Thus, in a preferred embodiment of the invention, the reactants (aldehyde and ketone) are at a temperature such that upon the mixing, the condensation temperature forms in situ, i.e. no addition or withdrawal of heat to the system is necessary to the attainment of the reaction temperature and immediately upon mixing, the reactants come to the reaction temperature or are at the reaction temperature. Alternatively, at the conclusion of mixing, the reactants can be at a temperature such that some reaction occurs, while a higher temperature is used for the reaction following the mixing.

The reactants suitable for use in the method of the invention include aldehydes and ketones generally, particularly lower saturated aliphatic aldehydes and lower ketones. The aldehyde can be a lower aliphatic or alkyl aldehyde, for example, such aldehydes containing up to about 4 carbon atoms, preferably up to 2 carbon atoms. Formaldehyde is well-suited for use in the method of the invention. The aldehyde can be in the form of an aqueous solution thereof, for example, in the case of formaldehyde, it can be a 30% aqueous solution. Ketones having up to about 8 carbon atoms can advantageously be employed. The ketone can be a lower aliphatic or lower alkyl ketone, e.g. saturated aliphatic or alkyl ketones having 3-5 carbon atoms, a lower aliphatic aromatic or alkylaryl ketone such as acetophenone, a lower cycloparaffin or cycloaliphatic ketone, such as cyclohexanone, or a lower alkyl substituted lower cycloparaffin ketone, such as methyl cyclohexanones. Mixtures of ketones and/or aldehydes can be employed.

For mixing the reactants and condensing agent together according to the invention, there can be employed any suitable mixing device effective to rapidly mix together the reactants. We have found that mixing nozzles as are commonly used to mix liquids, are well suited for use in the method of the invention to mix together the liquid reactants. For example, we have employed the multichamber mixing nozzle of the firm Paul Lechler, Stuttgart, Germany. Instead of a mixing nozzle, an injector can be used.

The particular reaction conditions employed will depend upon the system and the products desired. In general, the temperature for the reaction zone will be in the range of about 75–150° C. and the admixture at the conclusion of admixing is at about a temperature in this range. For temperature in the mentioned range, and when the ketone is introduced hot into the mixing zone and the aldehyde is introduced cold (i.e., at ambient or room temperature), for an aldehyde to ketone molar ratio in the range of about 0.9:1 to 2.5:1, the ketone can be pre-heated before introduction into the mixing zone to a temperature in the range of 120 to 270° C. Similarly when formaldehyde is pre-heated, it can be heated to 60–170° C.

The reaction time is in the order of seconds, e.g. from 30 seconds to less than about 320 seconds.

Proportions of the reactants can be as is known in the art for ketone aldehyde condensations.

In carrying out the process of the invention, the ketone, aldehyde and condensing agent are each stored in tanks equipped with metering pumps so that the contents may be withdrawn therefrom in regulated amounts. The ketone on withdrawal can be heated to a temperature in excess of that at which the condensation reaction is to be carried out. Following the heat treatment the ketone is passed into a mixing nozzle. The aldehyde and condensing agent, which can, for example, be sodium or potassium hydroxide in the form of a concentrated solution, are withdrawn from storage and admixed prior to introduction into the mixing nozzle. The condensing agent can be in the form of a 40–50% aqueous solution. The amount of condensing agent can be 20–200 grams of alkali metal hydroxide per liter of 30% formaldehyde solution. The aldehyde and condensing agent at the time of the introduction thereof into the nozzle can be at room temperature. In the mixing nozzle intensive mixing of the ketone, aldehyde, and condensing agent occurs and the admixture thereby formed is passed into a reactor. Some condensation occurs in the mixing device.

Advantageously, the reactor is of such a design that flow therethrough is in "plug" form, i.e. so that there is no substantial amount of back-flowing in the reactor. The reactor can be a cylindrical vessel of diameter 2.5 cm., length 27.5 cm., and volume 135 cm.$^3$. Velocity through the reactor can be about 0.81 cm./sec.

Heat can be added to the reactor if desired. After the reaction is completed, the condensing agent is neutralized with acid. Any mineral acid, for example, HCl can be used. The reaction product can be removed from the reactor and treated with the acid until a pH value of about 6–7 is reached. The acid buffers or neutralizes the reaction zone effluent and prevents further condensation. The reaction product is thereafter preferably washed and dried in the known manner.

The reaction can be carried out at normal pressure, however, it is advisable and in many cases necessary with reference to the value of the reaction temperature, i.e. in order to maintain liquid phase conditions in the reaction zone, to operate at medium pressures. In general, pressures of less than 50 atmospheres gauge will be sufficient for the reaction.

Particular embodiments of the invention are described in the accompanying examples.

*Example 1*

Methylethylketone was heated up to about 120 to 135° C. It was then mixed with a mixing nozzle with cold (i.e. room temperature) 30% formalin which had been made alkaline with 60 cc. of 44% NaOH/liter formalin. The molar ratio of formaldehyde and methylethylketone was 2.2:1. The temperature in the well insulated but unheated reaction chamber was above 80° C. The reaction time was 45 seconds. Neutralization was effected with 10% $H_2SO_4$. The pressure in front of the mixing nozzle was 18 atmospheres gauge and behind it about 14 atmospheres gauge. After the neutralization, the resin was washed six times with water. Thereupon the water was removed from the crude resin. 62% of the weight of the starting substance was obtained as a light, brittle resin of a melting point of about 80° C.

*Example 2*

To a mixture containing 80% methylethylketone and 20% cyclohexanone heated to 132 to 138° C., there were added cold formalin alkalized by addition thereto of 60 cc. per liter of 44% NaOH (molar ratio $CH_2O$:ketone=2.34:1). The temperature in the slightly heated reaction chamber was about 88° C. The reaction time was 34 seconds. Neutralization was effected with 10% $H_2SO_4$. The addition of the aldehyde and ketone was effected in a mixing nozzle. The pressure in front of the mixing nozzle was 18 atmospheres gauge and behind it 14 atmospheres gauge. About 65% of the weight of the initial substances was obtained in the form of a light, brittle resin of a melting point of about 100° C. In this example, the velocity in the reactor was 0.81 cm./sec.

*Example 3*

To a mixture of 90% methylethylketone and 10% acetophenone, there was added, after heating to 132 to 138 ° C., cold formalin alkalized by addition thereto of 60 cc. per liter of 44% NaOH (molar ratio $CH_2O$:ketone=2.25:1). The temperature in the heated reaction chamber was about 90° C. The reaction time was 32 seconds. Neutralization was effected with 10% $H_2SO_4$. The addition of aldehyde and ketone was effected in a mixing nozzle. The pressure in front of the mixing nozzle was 18 atmospheres gauge and behind it 14 atmospheres gauge. About 64% of the weight of the starting substances was obtained in the form of a light resin of a melting point of about 50° C.

*Example 4*

To cyclohexanone, after heating to 120 to 130° C., there was added cold formalin alkalized by addition thereto of 60 cc. per liter of 44% NaOH (molar ratio $CH_2O$:ketone=1.37:1). The temperature in the unheated reaction chamber was about 95° C. The reaction time was 41 seconds. Neutralization was effected with 10% $H_2SO_4$. Addition of aldehyde to ketone was effected in a mixing nozzle. The pressure in front of the mixing nozzle was 18 atmospheres gauge and behind it 14 atmospheres gauge. About 74% of the weight of the starting substances was obtained in the form of a light resin of a melting point of about 110° C.

*Example 5*

Acetophenone was heated to 250 to 270° C. and thereupon mixed with cold formalin (molar ratio HCHO:ketone=0.93:1), which was made alkaline with 200 cc. of 44% NaOH per liter of formalin. The temperature in the heated reaction chamber was about 120° C. The reaction time was 306 seconds. Neutralization was effected with 10% $H_2SO_4$. Additions of aldehyde and ketone were effected in a mixing nozzle. The pressure in front of the mixing nozzle was 18 atmospheres gauge and behind it 14 atmospheres gauge. About 68% of the weight of the starting materials was obtained as a brownish resin of a melting point of about 55° C.

*Example 6*

Formalin was heated up to 90–100° C. and then mixed with cold commercially available methylcyclohexanone (a mixture of the isomers), which was alkalized with 60 cm.$^3$ 44% NaOH per liter 30% formalin (mol ratio $CH_2O$:ketone=1.37:1). The temperature in the reaction chamber was about 90° C. Heat was not added to the reaction chamber. The reaction time amounted to 39 seconds, and the product was neutralized with 10% $H_2SO_4$. Additions of aldehyde and ketone were effected in a mixing nozzle. The pressure amounted before the mixing device to 18 atmospheres gauge pressure, behind it to 14 atmospheres gauge pressure. About 73% of the weight of the starting materials resulted as light (light colored) resin of melting point about 110° C.

*Example 7*

Formalin was heated up to 67–70° C., mixed in a mixing nozzle with cold acetone (mol ratio)

$$CH_2O:(CH_3)_2CO=1.5:1)$$

and 80 cm.$^3$ 44% NaOH/l. 30% formalin. The temperature in the reaction chamber was about 75° C. The reaction time amounted to 46 seconds. The product was neutralized with 10% $H_2SO_4$. The pressure before the mixing device was 18 atmospheres gauge pressure and behind it, 14 atmospheres gauge pressure. About 54% of the weight of the starting materials resulted as solid resin of melting point about 130° C.

*Example 8*

Diethylketone was heated up to about 130–145° C. It was then mixed in a mixing nozzle with cold 30% formalin, which was alkalized with 70 cm.³ 44% NaOH/l. formalin. The mol ratio of formaldehyde to diethylketone amounted to 2.1:1 The temperature in the reaction chamber amounted to 90° C., and the reaction time to 36 seconds. The product was neutralized with 10% H₂SO₄. The pressure before the mixing device was 18 atmospheres gauge pressure, behind it to 14 atmospheres gauge pressure. About 66% of the weight of the starting materials resulted as brittle resin of melting point about 85° C.

*Example 9*

Methylethylketone was heated up to about 60° C. and 30% formalin to about 75° C. Methylethylketone, formaldehyde and a 40% potassium hydroxide solution were mixed in a mixing device. The mol ratio of formaldehyde to methylethylketone amounted to 2.2:1. The potassium hydroxide quantity amounted to 55 cm.³ 40% KOH/l. formalin. The temperature in the reaction chamber was 80–100° C. The reaction time amounted to 45 seconds. The product was neutralized with 10% sulfuric acid. The pressure amounted before the mixing device to 18 atmospheres gauge pressure, behind it, about 14 atmospheres gauge pressure. 63% of the weight of the starting materials resulted as light colored brittle resin of melting point about 80° C. While I do not predicate my invention on any particular theory, it appears that by the instantaneous intensive mixing of reactants and the condensing agent according to the invention, local over-concentration of the condensing agent is avoided. As a result of this, it is possible to employ more condensation agent and a higher temperature than could be employed in heretofore known methods. This, in turn, results in a considerable shortening of the reaction time. The method of the invention also makes possible carrying out the condensation in a continuous manner, so that it is not necessary to employ the heretofore known multiple stage batch-wise operation. In the heretofore known operation for the production of a synthetic resin from methylethyl ketone and formaldehyde, it is necessary in order to avoid strong local overconcentration of the condensing agent to at first carry out a precondensation in which only a small amount of condensing agent is added to the reactants, and thereafter adding the additional amount of condensing agent necessary to complete the condensation. Excessive concentrations of condensing agent subsequent to the precondensation reaction, it appears, is not harmful on the course of the reaction. According to the present invention, however, no precondensation is necessary.

The resin product of the invention has a favorable color number and is of uniform quality.

Temperatures set forth herein are in ° C. unless otherwise indicated.

What I claim is:

1. The method for producing normally solid resins by a condensation reaction of formaldehyde and a ketone selected from the group consisting of methylethylketone, cyclohexanone, methylcyclohexanone, and acetophenone, carried out in the presence of an alkaline condensing agent selected from the group consisting of sodium hydroxide and potassium hydroxide, which comprises introducing said aldehyde, said ketone and said alkaline condensing agent into a mixing zone, the molar ratio of aldehyde to ketone being in the range of about 0.9:1 to 2.5:1, the amount of condensing agent being substantially sufficient for completion of the condensation and in said mixing zone rapidly and intimately mixing the ketone, aldehyde and alkaline condensing agent to instantaneously form an admixture in which said aldehyde, ketone and alkaline condensing agent in the proportion and amount stated are substantially uniformly dispersed, the said ketone, aldehyde, and alkaline condensing agent being at substantially reaction temperature at the conclusion of the mixing, introducing said admixture into a reaction zone, and maintaining the admixture in the reaction zone at a temperature between about 75 and 150° C. for a time sufficient for condensation to take place and production of the normally solid resin.

2. The method of claim 1, wherein at the time of said introduction into said mixing zone, the condensation reactants are at temperature such that said temperature of about 75–150° C. forms in situ upon the mixing of the reactants.

3. The method of claim 1, wherein the reaction time is about 30–320 seconds.

4. The method for producing normally solid resins by a condensation reaction of formaldehyde and a ketone selected from the group consisting of methylethylketone, cyclohexanone, methylcyclohexanone, and acetophenone, carried out in presence of an alkaline condensing agent selected from the group consisting of sodium hydroxide and potassium hydroxide, which comprises introducing said aldehyde, said ketone and said alkaline condensing agent into a mixing zone, the molar ratio of aldehyde to ketone being in the range of about 0.9:1 to 2.5:1, the amount of condensing agent being substantially sufficient for completion of the condensation, the condensation reactants at the time of said introduction to said mixing zone being such that a condensation temperature of about 75–150° C. forms in situ upon the mixing of the reactants, the temperature of one of the reactants before the mixing being above the condensation temperature employed, and the temperature of the other of the reactants before the mixing below the condensation temperature employed, the alkaline condensing agent being contained in the latter reactant, and in said mixing zone rapidly and intimately mixing the ketone, aldehyde and alkaline condensing agent to instantaneously form an admixture in which said aldehyde, ketone and alkaline condensing agent are substantially uniformly dispersed, the said ketone, aldehyde, and alkaline condensing agent being at substantially condensation temperature at the conclusion of the mixing, introducing said admixture into a reaction zone, and maintaining the admixture in the reaction zone at a temperature between about 75 and 150° C. for a time sufficient for condensation to take place and production of the normally solid resin.

References Cited

UNITED STATES PATENTS

| | | | |
|---|---|---|---|
| 2,191,802 | 2/1940 | Novotny et al. | 260—64 |
| 2,237,325 | 4/1941 | Balz | 260—64 |
| 2,303,370 | 12/1942 | Kugler et al. | 260—64 |
| 2,462,031 | 2/1949 | Wittcoff | 260—64 |
| 2,540,886 | 2/1951 | Hurst et al. | 260—64 |
| 2,641,591 | 6/1953 | Gagarine | 260—64 |
| 2,540,886 | 2/1951 | Hurst et al. | 260—64 |

FOREIGN PATENTS

| | | |
|---|---|---|
| 490,471 | 2/1953 | Canada. |
| 795,012 | 5/1958 | Great Britain. |

WILLIAM H. SHORT, *Primary Examiner.*

L. M. PHYNES, *Assistant Examiner.*

UNITED STATES PATENT OFFICE
CERTIFICATE OF CORRECTION

Patent No. 3,329,654　　　　　　　　　　　　July 4, 1967

Helmut Schwarzhans

It is hereby certified that error appears in the above numbered patent requiring correction and that the said Letters Patent should read as corrected below.

Column 6, line 61, strike out "2,540,886　2/1951　Hurst et al.------260-64" and insert instead -- 2,711,971　6/1955　Miller et al.------260-64 --.

Signed and sealed this 11th day of June 1968.

(SEAL)
Attest:

Edward M. Fletcher, Jr.　　　　　　　　　　　EDWARD J. BRENNER
Attesting Officer　　　　　　　　　　　　　　Commissioner of Patents